United States Patent
Gorman et al.

(10) Patent No.: US 7,996,513 B2
(45) Date of Patent: Aug. 9, 2011

(54) MONITORING OPERATIONAL DATA IN DATA PROCESSING SYSTEMS

(75) Inventors: David J. Gorman, Chandlers Ford (GB); Michael J. A. Johnson, Awbridge (GB); Martin R. Naish, Newbury (GB); Anthony J. O'Dowd, Winchester Hampshire (GB); Steven Powell, Winchester (GB); Stephen B. Toledo-Brown, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 10/555,121

(22) PCT Filed: May 6, 2004

(86) PCT No.: PCT/GB2004/001960
§ 371 (c)(1),
(2), (4) Date: Nov. 1, 2005

(87) PCT Pub. No.: WO2004/099980
PCT Pub. Date: Nov. 18, 2004

(65) Prior Publication Data
US 2007/0143455 A1    Jun. 21, 2007

(51) Int. Cl.
*G06F 15/173* (2006.01)
(52) U.S. Cl. .................................. 709/224; 709/223
(58) Field of Classification Search .............. 709/223, 709/224, 318; 717/127, 130; 714/39, 47, 714/48, 84; 702/184; 370/242
See application file for complete search history.

(56) References Cited

U.S. PATENT DOCUMENTS

| | | | |
|---|---|---|---|
| 6,263,458 B1 * | 7/2001 | Miller et al. | 714/47 |
| 6,353,924 B1 | 3/2002 | Ayers et al. | 717/4 |
| 6,467,052 B1 * | 10/2002 | Kaler et al. | 714/39 |
| 2002/0120918 A1 * | 8/2002 | Aizenbud-Reshef et al. | 717/127 |

FOREIGN PATENT DOCUMENTS

| | | |
|---|---|---|
| EP | 0443972 A2 | 8/1991 |
| GB | 2310937 A | 9/1997 |

OTHER PUBLICATIONS

Aizenbud-Reshef, Netta, "MQSeries Integrator-Message Generator and Coverage Anaylsis Tools", Version 1.1, IBM Haifa Research Lab, XP002320520, pp. 1-27, Jan. 2002.

* cited by examiner

*Primary Examiner* — Joseph E Avellino
*Assistant Examiner* — Marshall McLeod
(74) *Attorney, Agent, or Firm* — Steven M. Greenberg, Esq.; Carey, Rodriguez, Greenberg & Paul

(57) ABSTRACT

Provided are methods, apparatus and computer programs for monitoring operational data relating to a sequence of data processing operations in a network of data processing units. In response to specified boundaries for data gathering, operational data is selectively gathered into discrete data partitions for a desired time period, a desired set of processing nodes, and/or a desired set of process executions. A set of event listeners invoke operations of a data gatherer in response to events within a processing sequence and the data gatherer allocates operational data to different ones of a set of discrete logical data containers in response to notifications from the event listeners. The data collection is responsive to system events such as a collection interval expiry to end data collection for a first partition and start data collection for a second partition.

25 Claims, 12 Drawing Sheets

FIGURE 5

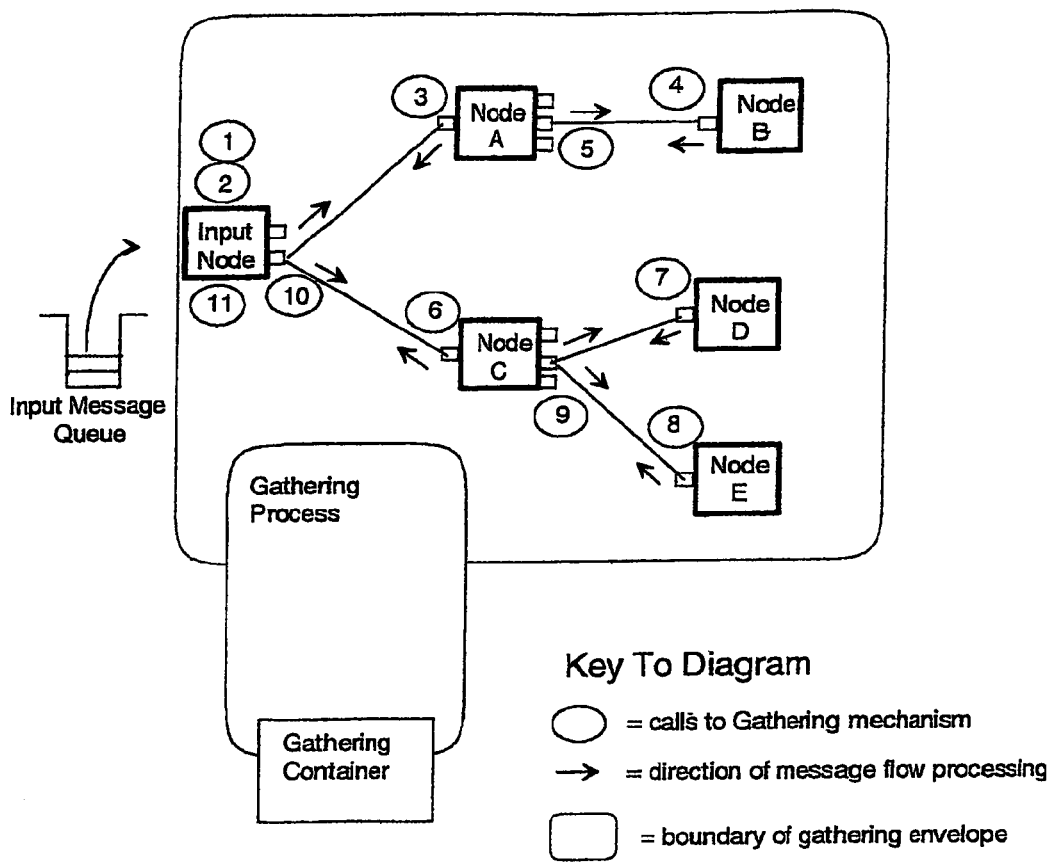

Key To Diagram

◯ = calls to Gathering mechanism
→ = direction of message flow processing
▢ = boundary of gathering envelope

Protocol Calls to Gatherer

1. Start gathering node statistics in input node
2. Start gathering message flow statistics upon de-queue of input message
3. Switch gathering from Input Node to Node A in input terminal of Node A
4. Switch gathering from Node A to Node B in input terminal of Node B
5. Switch gathering from Node B to Node A on return to output Terminal Node A
6. Switch gathering from Node A to Node C in input terminal of Node C
7. Switch gathering from Node C to Node D in input terminal of Node D
8. Switch gathering from Node D to Node E in input terminal of Node E
9. Switch gathering from Node E to Node C on return to output Terminal Node C
10. Switch gathering from Node C to Input Node when return to Input Node
11. End Gathering in the input node for the processing of the Input message

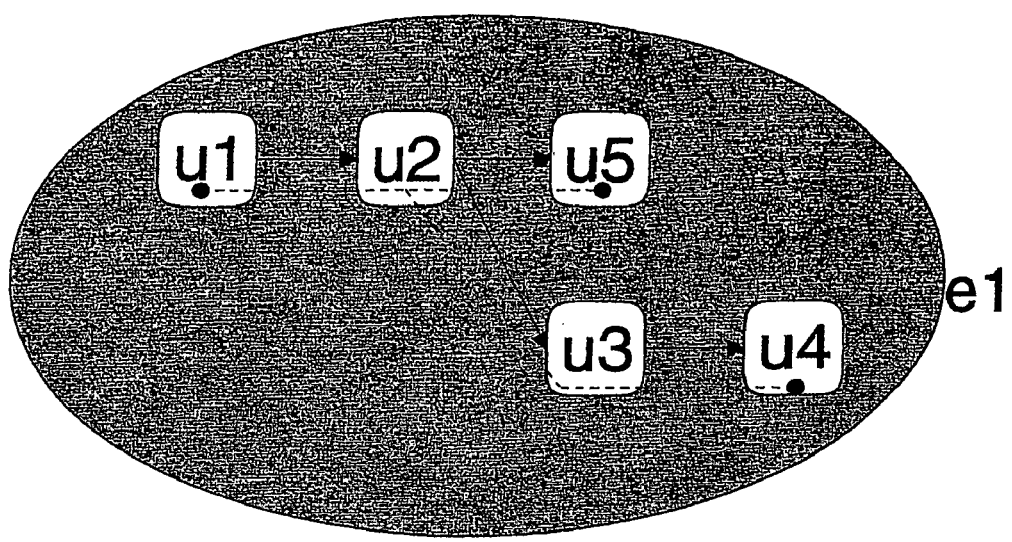
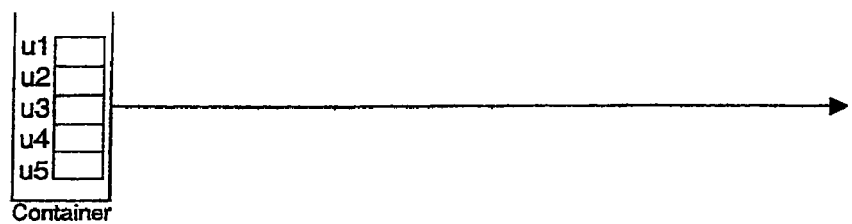
●- - - -● Flow of control
⎯⎯→ Network connections between processing units
FIGURE 6A

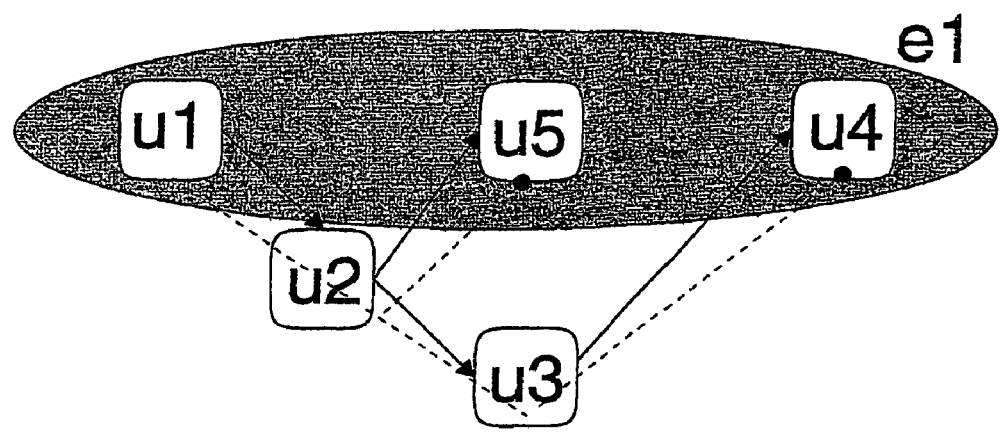
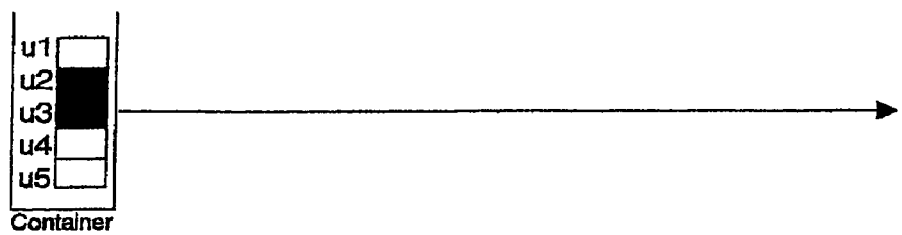
● - - - - ●    Flow of control
———▶    Network connections between processing units
FIGURE 6B

● - - - - ●  Flow of control
■ ———— ■  Network connections between processing units
◆———▶  The container gets updated as control flows and returns through the Envelope. Each processing units operational data updated multiple times.

MONITORING OPERATIONAL DATA IN DATA PROCESSING SYSTEMS

FIELD OF INVENTION

The present invention relates to monitoring of operational data, such as for performance or usage statistics monitoring.

BACKGROUND

The growth of systems integration and inter-company networking in recent years has been accompanied by an increasing requirement for intelligent approaches to the monitoring of operational data. For example, where a number of different enterprises or departments within an enterprise rely on a specific service provider, the service provider may need to charge the different users according to their usage or to allocate resources between different users. This requires monitoring of one or more usage metrics such as CPU cycles or other resources used, or the number of data items or bytes processed. Secondly, the ever-increasing need for consistently high performance of data processing systems necessitates efficient performance monitoring and analysis.

A number of monitoring and debugging solutions have been proposed which involve adding instrumentation to each of the network nodes to be monitored, or adding dedicated reporting nodes to the network. However, these solutions are typically unsuitable for a production environment because the additional processing of the monitoring tasks impacts the overall performance of the system and/or distorts the operational flow. In many cases, a decision to implement operational data monitoring requires deployment of modified application code in which the monitoring has been enabled. Furthermore, many of the available solutions fail to allow performance monitoring of individual data processing components within the scope of a single application program execution.

U.S. Pat. No. 6,467,052 describes a method and apparatus for enabling a developer to analyze performance of a distributed data processing system within a programming/debugging environment. The method of U.S. Pat. No. 6,467,052 relies on significant instrumentation of the computers to be monitored. To avoid performance problems during normal productive use, the event monitors and periodic monitors of U.S. Pat. No. 6,467,052 are only active while the developer is analysing the performance and function of the system.

There remains a need in the art for improved methods and apparatus for efficiently monitoring operational data, which methods and apparatus are non-intrusive and are suitable for use in a production environment.

SUMMARY

Aspects of the present invention provide methods, apparatus and computer programs for monitoring operational data relating to a data processing operations performed by a plurality of data processing units in a data processing apparatus or network. The data processing units may be a plurality of program code modules within a single computer program running on a single computer, or a plurality of cooperating data processing units distributed across a network of computers. In a first aspect of the invention, logical boundaries are defined for delimiting operational data which is collected into a particular data partition corresponding to a logically distinct storage area. The defined boundaries are applied by a data collection mechanism separate from the data processing units being monitored, to determine which data is saved to a distinct data partition, thereby controlling selective collecting of desired operational data. The logical boundary may be defined in terms of a specific set of data processing units for which operational data is required and/or a specific time period.

The ability to control data collecting according to a defined logical boundary enables automated saving into a specific data partition of the exact operational data required by a user. This avoids complex filtering through unwanted stored data to extract relevant data for subsequent analysis. For example, a user may wish to monitor operational data such as the number of data items processed, CPU usage or wait times by a specific set of data processing units during a specific time period, and this is achievable by defining an appropriate physical and temporal boundary. Separating the mechanism for allocating data to data partitions from the data processing units reduces the impact of monitoring on the processing units being monitored.

In existing solutions, if operational data is stored in a single continuous storage area, it becomes necessary to carry out significant analysis of the stored data subsequent to the actual monitoring steps in order to identify which data is relevant to a user's requirements.

Furthermore, selective gathering of data into partitions related to user requirements can reduce the amount of data which needs to be saved. For example, if all data held within a container relates to a single execution of a sequence of data processing operations (thread), it is not necessary for each data item to be saved with a thread identifier—only the container includes the thread identifier. If all data relating to a specific node of a network of processing nodes is held in a single container or a specific segment of a container, it is sufficient for the container or container segment to include the node identifier instead of every data record requiring a node identifier.

The data collection mechanism preferably comprises: a data gatherer which gathers operational data for a selected set of data processing units into discrete data containers for each processing thread executed by the set of data processing units; and a collector, running asynchronous to the gatherer, which accumulates data from the data containers which correspond to a defined logical boundary.

According to one embodiment of the invention, a data gatherer saves metered operational data for a set of data processing units corresponding to a sequence of data processing operations into a first discrete logical data container. One or more event listeners associated with the plurality of data processing units send notifications to the data gatherer in response to events within the sequence of data processing operations. The data gatherer responds to certain of these notifications by updating data records within the container, and responds to other notifications by switching data gathering to a second container.

The data collection mechanism is preferably also responsive to system-event notifications to switch data collection from a first logically bounded data partition to a second data partition. There may be a plurality of logical data containers within a single logical boundary. The system-event notification may be a notification of expiry of a data collection time period. When data gathering is complete for a data partition, the data containers corresponding to the completed data partition are collected together and their data is accumulated for subsequent analysis and/or reporting.

Event triggered switching between data partitions associated with user-defined logical boundaries, and switching between logical data containers, provides an efficient allocation of operational data into separate partitions related to the user's requirements. This may include separating operational data relating to different data processing units or groups of data processing units, or separating data relating to different time periods, and separating operational data relating to different stages of processing within a computational flow.

In a preferred embodiment, the use of a data gatherer for handling metered operational data, together with event listeners associated with the monitored data processing units triggering functions of the data gatherer, enables provision of non-intrusive monitoring (i.e. monitoring with minimal impact on the performance of the sequence of data processing operations).

The event listeners are preferably associated with generic connection points between the data processing units, rather than instrumenting operational data processing components of the data processing units. This facilitates use of the event listeners with a variety of different types of data processing units without re-coding for each processing unit, and consequently avoids event listener complexity. The saving in event listener complexity complements the above-described separation of event listeners from the metering functions and the mechanism for saving operational data, by enabling the event listeners themselves to be implemented as small program code components. This has the advantage that the event listeners do not significantly affect the performance of the monitored data processing units—a major problem with many monitoring solutions which rely on substantial instrumentation of the systems being monitored. In a preferred embodiment of the present invention, the operational data monitoring and subsequent data analysis are almost independent of the monitored sequence of data processing operations.

According to a preferred embodiment of the invention, automated triggering of the start and end of a container by an event listener notification (preferably a function call invoking functions of the data gatherer) enables efficient delimiting of data collection for each of the data processing units. A collector component is preferably provided to run asynchronously to the data gatherer and to accumulate data from the set of logical containers within a defined logical boundary. This asynchronous operation, preferably using intermediate queueing of logical containers between the data gatherer and the collector to serialize the accumulation of data from different containers, serves to avoid interlock between different instances of the data gatherer during collector processing.

The collected data may include statistical data for performance analysis (which may be used to tune the monitored data processing sequence), usage data for accounting purposes, and/or snapshots of operating characteristics to enable preventative action when potential problems appear likely.

The discrete logical containers are preferably specific to an individual processing thread within the sequence of data processing operations, whereas the defined logical boundary may encompass a plurality of separate threads within a selected set of data processing units and a specified time period.

Methods according to the present invention may be implemented in computer program code for controlling the operation of a data processing apparatus on which the program code runs. The program code may be made available for electronic data transfer via a network, or as a program product comprising program code recorded on a recording medium.

BRIEF DESCRIPTION OF DRAWINGS

Embodiments of the invention are described below in detail, by way of example, with reference to the accompanying drawings in which:

FIG. 5 shows a number of function calls from event listeners to a data gatherer according to a protocol of an embodiment of the invention;

FIG. 6A shows a first network boundary ("envelope") encompassing all of the processing units within a network, with a single container receiving operational data for the envelope;

FIG. 6B shows a second envelope bounding a subset of a network, associated with a single container;

DETAILED DESCRIPTION OF EMBODIMENTS

Figure 1:
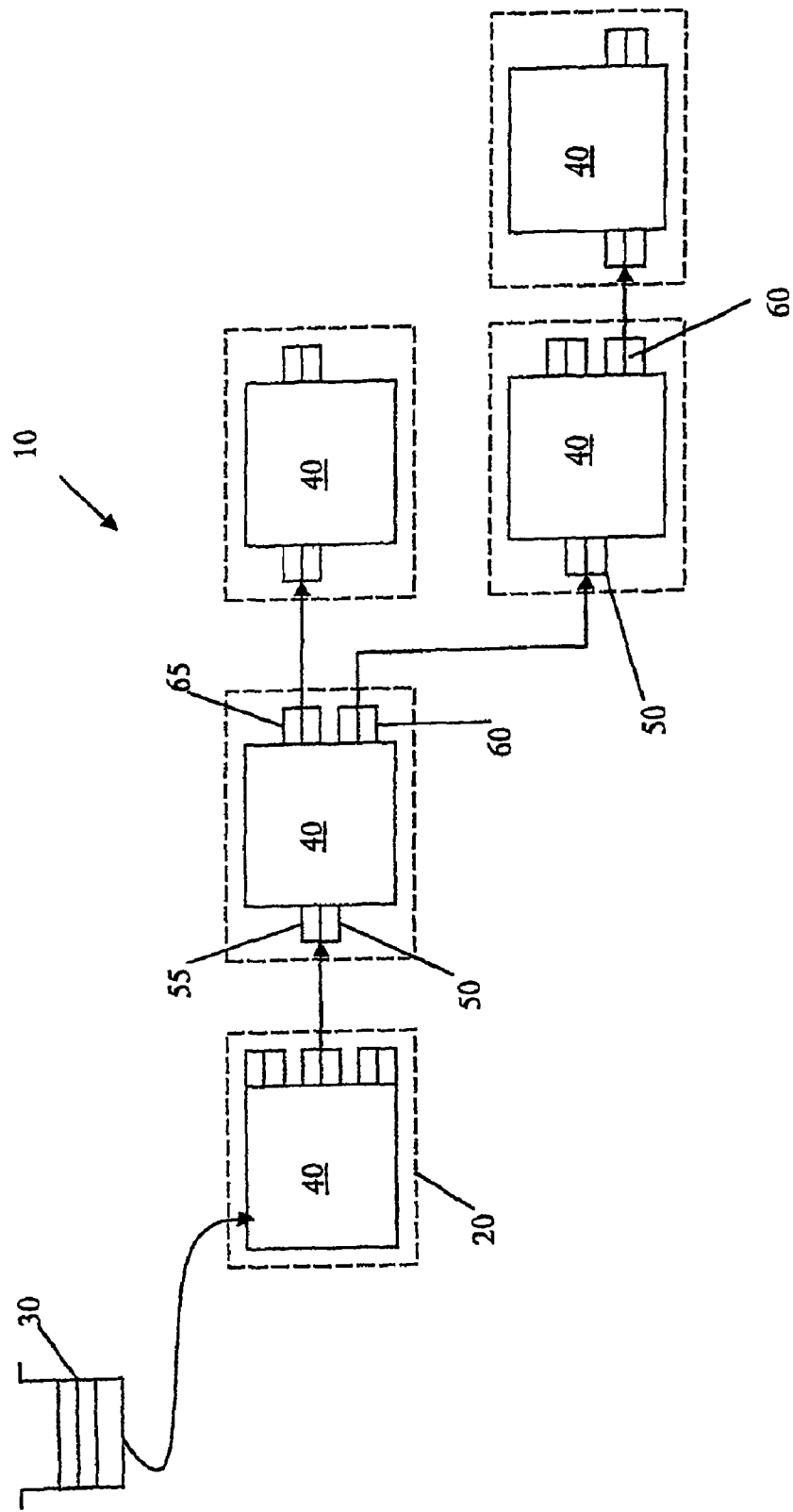
FIG. 1 is a schematic representation of a network of interconnected data processing units, in which connection points of the processing units include event listeners according to an embodiment of the invention.

FIG. 1 shows a network 10 of cooperating processing units 20 connected by mechanisms that transfer computational flow between the processing units. The first node of the set of processing units takes input data items from a queue 30 to initiate a processing sequence. Other than this first 'input node' (which may not have an input connection point), each data processing unit 20 of the set of data processing units includes one or more input connection points 50, one or more operational processing nodes 40, and one or more output connection points 60. The input and output connection points 50,60 are generic components that provide a simple interface between each of the operational processing nodes 40. Each of the operational processing nodes and input and output connection points within a data processing unit 20 are preferably program code components, such that the set of data processing units can be connected to form one or more processing paths within a computer program computational flow.

The set of data processing units may be implemented within a general purpose data processing apparatus, such as a desktop computer or networked group of computer systems, or another device selectively activated or configured by one or more computer programs stored in the computer. In addition, the specification discloses a recording medium having a computer program recorded thereon. The medium is a computer-readable storage medium including, for example, a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD. The program code components disclosed herein are not intended to be limited to any particular programming language or operating system environment.

A number of different operational processing nodes are available to perform various different operations. After processing by a first operational processing node 40, a data item is passed to the output connection point 60 of the current node and transferred to the input connection point 50 of the subsequent data processing unit in the sequence. The processing units may be connected processing nodes of a single computer program running on a single data processing system. The operations performed by the operational processing nodes may include filtering, format conversion, transformation such as to add or update data fields, aggregating of multiple inputs, compute functions, etc. Alternatively, processing units within the network may include application-specific program code ("business logic"), and/or may be distributed across a network of computers.

The input connection points 50 each have an associated storage area for receiving data from a connected data processing unit, and output connection points 60 each have an associated storage area for receiving the results of processing by the current processing unit in readiness to transfer to the next processing unit in the computational sequence. The output connection points 60 also include functionality, implemented as program code instructions, for making calls to an underlying data transfer mechanism to move data from the storage of the output connection point of a current processing unit to an input connection point of a connected processing unit. Input connection points 50 include functionality for triggering the operation of their associated operational processing node.

The above-described processing unit structure enables each operational processing node within the data processing units to be independent of each other and substantially independent of connector functionality. This independence simplifies the creation of new processing flows and addition of new data processing units to the network. Operational processing nodes can be connected together in a desired sequence via the connection points regardless of differences between the operational processing nodes themselves.

An embodiment of the invention is described below with reference to a network of processing units such as described above, but specific aspects of the invention are not limited to such a network architecture. The solution according to this embodiment enables monitoring of the progress of computational flow through the network, identification of performance problems associated with specific processing units, and monitoring of usage of specific processing units or specific parts of the network.

Where reference is made to features and/or steps in the accompanying drawings which have the same reference numerals, those steps and features have the same function(s) or operation(s).

Architectural Overview

Figure 2:
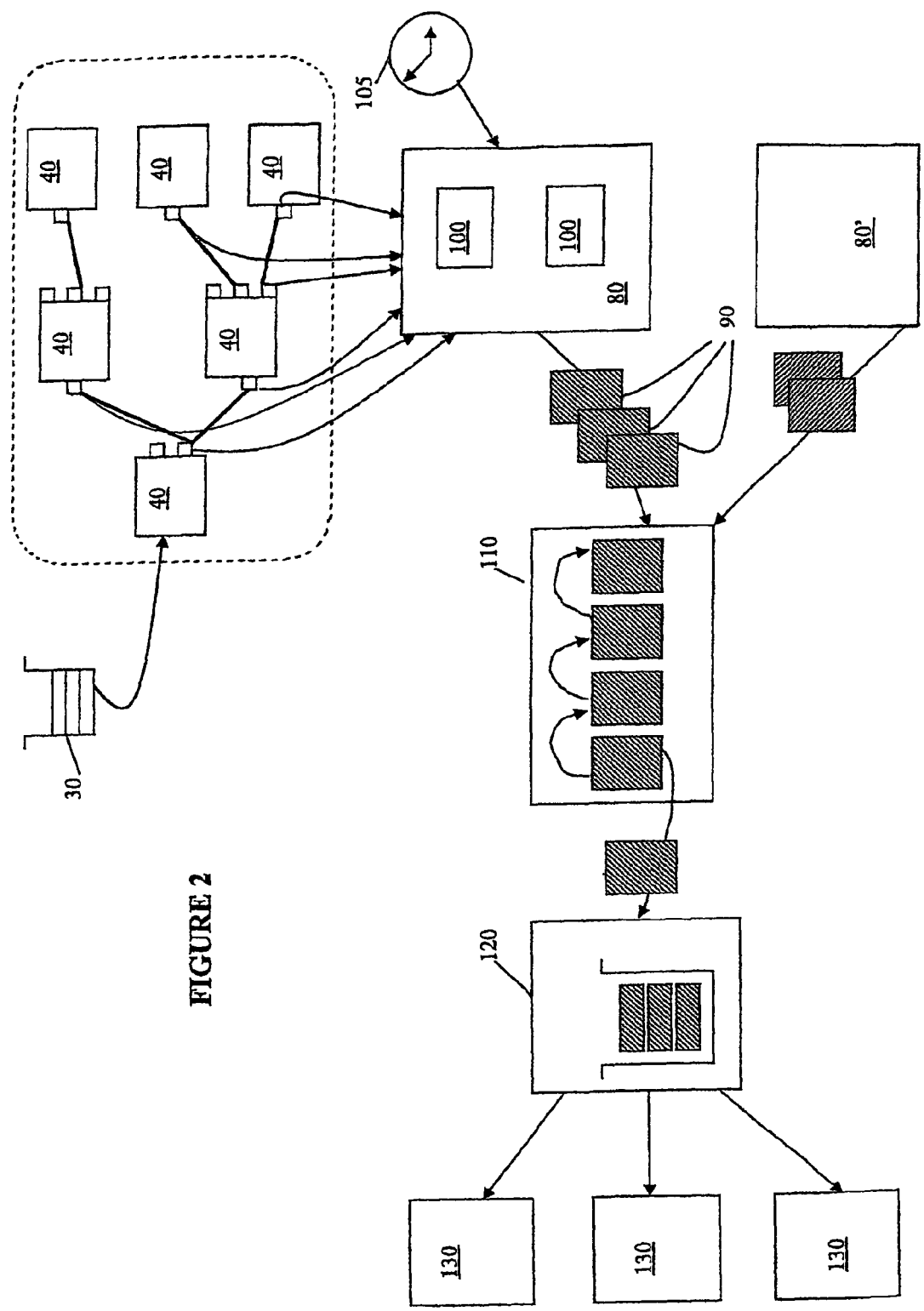
FIG. 2 is an architectural overview of a data monitoring solution according to an embodiment of the invention.

A solution for monitoring operational data for a network of processing units includes the following components and mechanisms, as shown in FIGS. 1 and 2:

a set of event listener components 55,65 (see FIG. 1) located at the input and output connection points 50,60 for invoking functions of a data gatherer 80 (see FIG. 2) in response to events in the processing flow;

a data gatherer 80 for creating logical containers 90 to store operational data, for allocating and saving data to specific containers in response to event listener notifications, and for responding to certain event notifications by saving completed containers to a FIFO queue 110 for retrieval by a collector 120;

a collector 120 for accumulating the data held in related containers, for subsequent performance analysis or generation of statistical or accounting data; and a set of output components 130, including report writers and accounting modules.

Figure 4A:
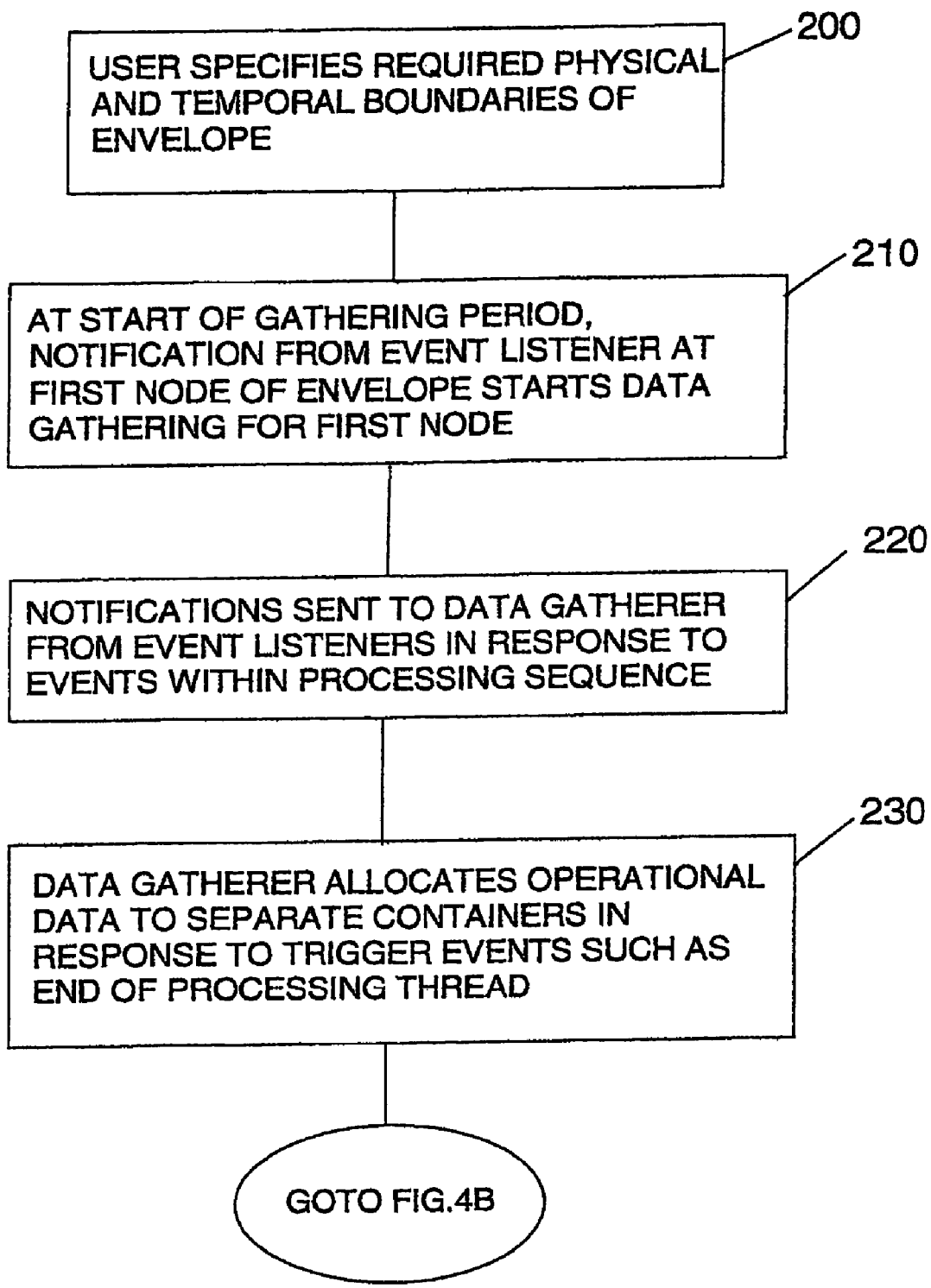
FIGS. 4(*a* and *b*) shows a sequence of method steps of an embodiment of the invention when used to monitor operational data.
Figure 4B:
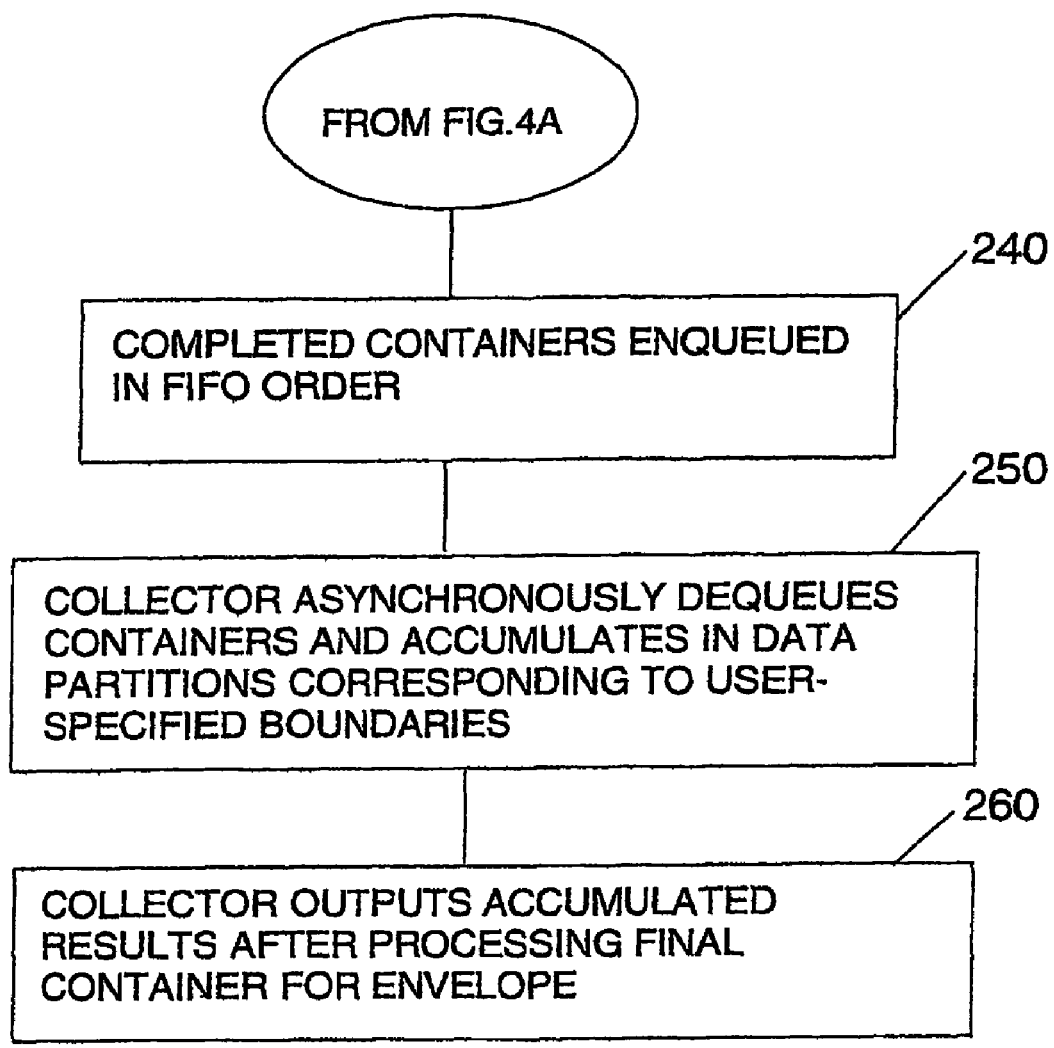

The functions of and relationships between the above components are described in detail below with reference to FIGS. 2, 4 and 5.

Data gathering is enabled and disabled through the use of a global system value, which a user can change using a command line entry. The user in this context may be a person responsible for statistics or performance monitoring, or a configuration manager responsible for configuring the system for desired data monitoring. The user also has the option to specify increased granularity of gathering through command line entries which set other system values—such as to specify whether node-specific metrics are to be gathered, or to specify 200 a particular network domain or segment for which monitoring is required. A number of different data gatherer instances 80, 80' may be running concurrently to gather data for a different set of network nodes.

Figure 3:
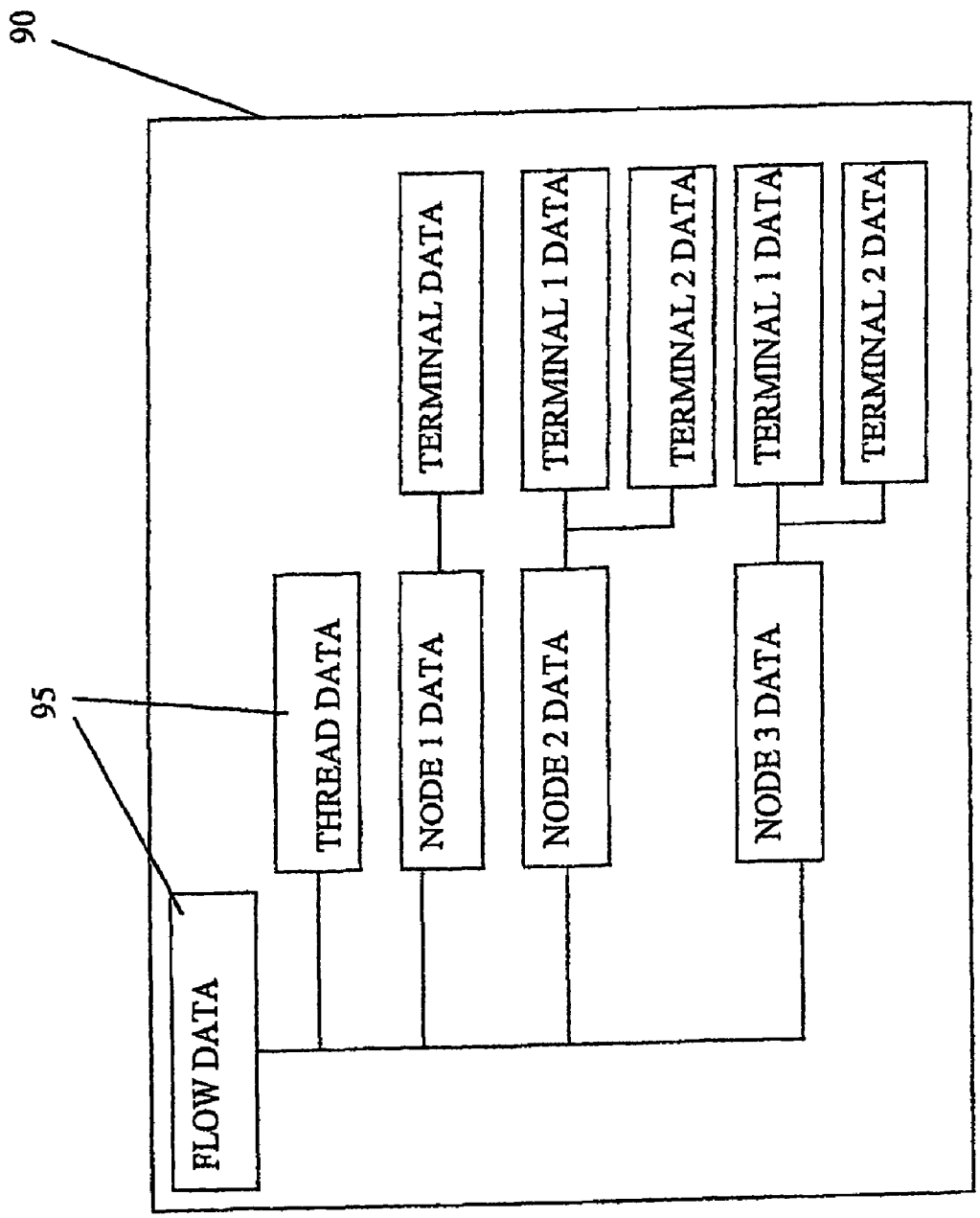
FIG. 3 is an hierarchical data model of a logical container for operational message flow data.

The gatherer 80 manages allocation of operational data into accumulators 95 within logically distinct storage areas 90 (referred to as 'containers' herein). Containers are created by the gatherer as pre-allocated areas of storage into which the gatherer saves data. The organisation of accumulators 95 within a container 90 is shown in FIG. 3. An accumulator 95 is a storage area segment together with an associated update mechanism (or 'meter') 100 for incrementing the data stored in the accumulator, and is used for recording notifications from the event listeners 55,65. An accumulator may be used to count invocations of a processing node, or to count the number of processed data items within a gathering period. Additional accumulators count the number of transactional commits and the number of backouts, or the number of active threads compared with a maximum number of available threads. The accumulators are incremented in response to function calls from the event listener components. Not all accumulators include counting mechanisms—other accumulators are associated with a different type of meter such as to record the size of messages (maximum, minimum and average). Some meters 100 such as simple counters are implemented within the gatherer 80, but additional external meters 100 may also be used.

In addition to the accumulators managed by the data gatherer, typical data processing systems provide a system clock 105 which the data gatherer can refer to for a measure of elapsed time, wait times and CPU usage time. Additionally, notification of expiry of a time period can signal the end of a data collection period—as will be described later The data gatherer can also use an existing CPU usage meter when available on the system, or incorporate a CPU usage meter within its integral set of meters.

The event listener components 55,65 send 210, 220 notifications to the data gatherer 80 in response to a number of predefined events occurring within the computational flow being monitored. As shown in FIG. 5 (see steps (3) to (9)), one such event is a transfer of data from a first data processing unit to a second data processing unit. A call to the data gatherer 80 in response to this 'switch' (or transfer) event prompts the gatherer to switch off data gathering for an accumulator associated with the first data processing unit and simultaneously to switch data gathering on for an accumulator associated with the target processing unit. Any operational data output to a container by the data gatherer immediately after the switch will relate to the target data processing unit, and so is recorded in the corresponding accumulator. The notifications of transfers between processing nodes and other notifiable events implicitly indicate the progress of the computational flow, such that only minimal information needs to be sent within each event listener notification.

Other notifiable 'trigger' events include processing errors and timeouts, and commits or backouts of transactional operations. In preferred implementations, the calls from the event listeners are function (method) calls which invoke functions of the data gatherer. However, alternative implementations may use event notifications other than function calls.

Managing data gathering using the event listeners 55,65 at connection points 50, 60 and using accumulators 100 and analysis tooling 120,130 separate from the data processing units 20, allows the independence of the processing units to be maintained.

The data gatherer gathers 230 the operational data for each execution of the computational flow into a gathering container 90, which is a specific data partition logically distinct from other gathering containers. A single gathering container may be shared between a number of processing units, but is unique to a processing thread within the network 10 of processing units 20. Each container 90 has an identifier which relates it to a particular execution instance and processing path through the network of cooperating processing units. Thus, each container has a storage area for containing operational data for a specific processing thread of a selected set of data processing units. The data gatherer 80 outputs operational data to logical containers 90 for subsequent processing. There may be a number of containers (corresponding to a number of executions of the processing sequence) within a single logical boundary as will be described below.

Containers typically have a number of discrete segments corresponding to the different accumulators, for separately storing data relating to different data processing units, and for storing thread-specific data separately from data identifying the computational flow. While operational data is gathered separately for each computational flow, users are able to specify the type and granularity of the data they require for their final performance analysis or statistics reports. The implementation described here includes two broad data categories:

1. Thread related data for the specific computational flow. For example, this may include the average size in Kbytes of input messages processed over a specific 15 minute collection interval, on thread 4 of the thread pool used by a specific computational flow of a specific execution group of processing units of a specific computer program.
2. Node related data for the specific computational flow. For example, this may include the maximum amount of CPU used by a single message during processing in a single compute node of a specific computational flow (within the specific execution group of processing units of the specific computer program) during a specific 30 minute time period.

A protocol is provided for identifying logical start and end points for the gathering of operational data for a processing sequence within the user-selected network of processing units. This is shown in FIG. 5. The input node corresponding to the first data processing unit within the selected set of data processing units is configured to send a "Start Gathering" call (1) to the gatherer when the input node begins waiting for input (which may be prior to thread allocation) and to send a "Start Message" call (2) when valid data is input to start execution of the processing sequence. The output connection point of the last processing unit of the user-specified set of processing units is configured to send an "End Gathering" call when the executed processing sequence reaches this output connection point (or when control is switched (10) back to the start node and "End Gathering" (11) is issued by the start node, as shown in the example implementation of FIG. 5 and described later in the context of message flows.)

The nodes selected for implementing the function calls for the start of data gathering and the end of data gathering may be the first and the last nodes of a user-specified set of nodes—such that the start and end nodes physically delimit the logical boundary for data gathering. The logical boundary can also be delimited by time periods. Typically, a logical boundary for the monitoring of operational data comprises both a physical network boundary (defined by a selected set of processing units) and operational or time-related delimiters (for example, start and end time). This data partition delimited by the logical boundary is referred to as an "envelope" herein. An additional parameter of the boundary may correspond to a predefined number of complete executions of processing for an input data item through the computational flow. The number of complete executions may correspond to a number of processed messages.

The gatherer responds to the start gathering and end gathering function calls to logically partition monitored operational data into containers. In addition to start and end gathering calls, a set of other event-triggerable function calls are provided in each event listener and these control the gathering of data into logically distinct containers and accumulators within those containers. A collector 120 responds to time-related notifications to logically partition data into "envelopes" which correspond to logical partitions of interest to the user. The temporal boundaries of the envelope are not tied to the lifetime of the flow through the network. The collector controls the lifetime of the envelope in accordance with a defined (e.g. user-specified) gathering period, as described below.

A number of timer intervals are used within the gathering and accumulating stages of the collecting process:
1. A fixed timer interval (monitored by reference to the system clock) within the gatherer—approximately 5 seconds, for example. This is used to decide when to handoff a completed gathering container in the case where there have been zero or an insufficient number of input data items (e.g. Messages) received by the set of data processing units in that time period.
2. A fixed 20 second timer interval (monitored using the system clock) within the Collector that is used to control Snapshot intervals.
3. A Major interval Timer. This is configured by the user through command line entry (typically using values ranging from 10 minutes to 10 days). This is used to control the Archive intervals.

The Gatherers are independent from the Collector, and vice versa. Gatherers are not required to take account of the Major Interval period or the Snapshot period. They gather data and transfer 240 responsibility for ("hand off") completed containers to the Conveyor. The criteria used to decide when to hand-off are as follows:

(a) The number of input messages that have completed processing through the message flow (b) The shape of the envelope has changed—and therefore the mix of data to gather may be different. In this case the Gatherer may obtain another container in which to continue to gather further data.

(c) The time limit as described in 1. above has expired.

The container is marked with a gathering "version" number. When there has been a change in the shape of the envelope, the version number is incremented.

Figure 6C:
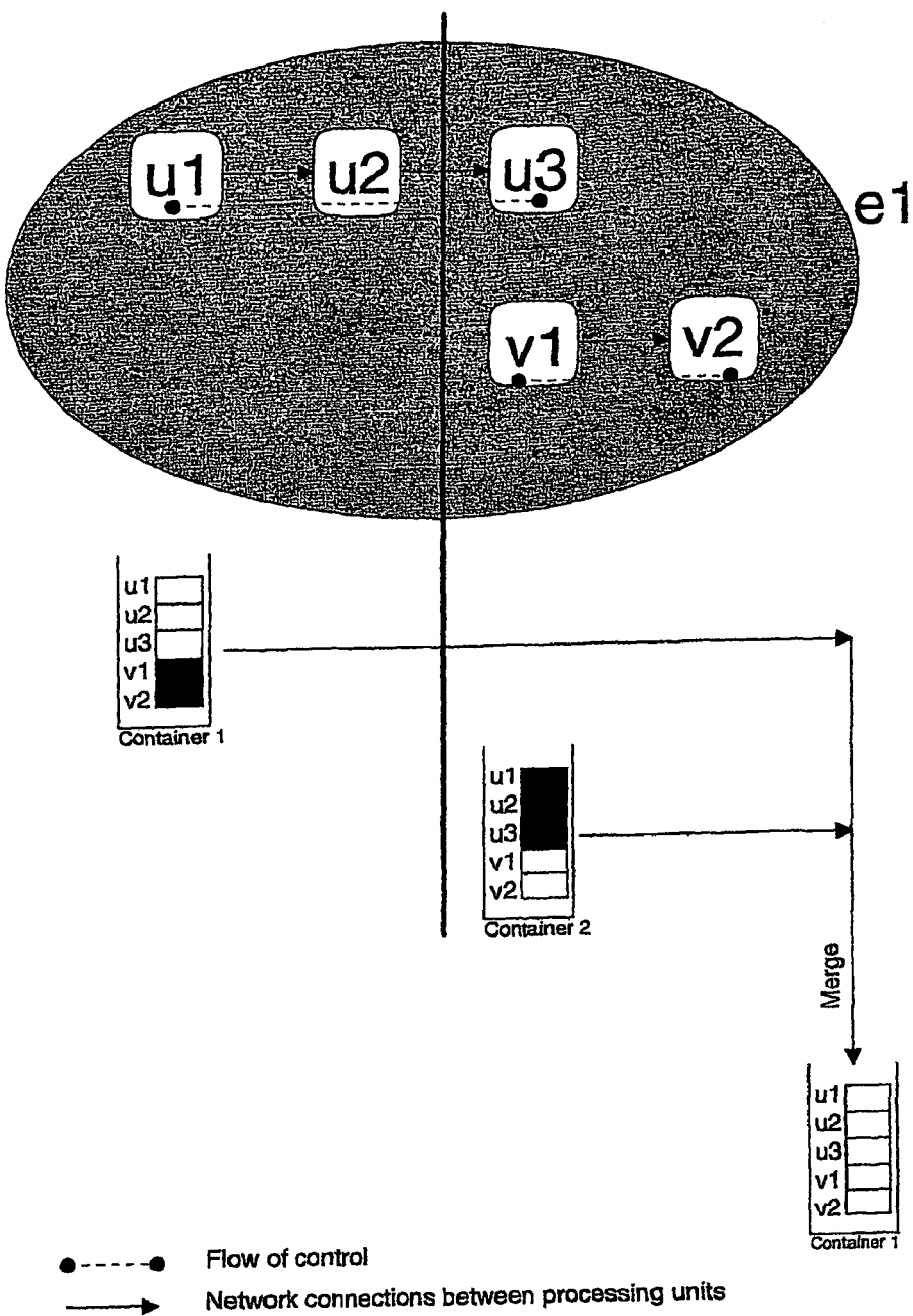
FIG. 6C shows an envelope spanning multiple networks, with a separate container for each network.
Figure 6D:
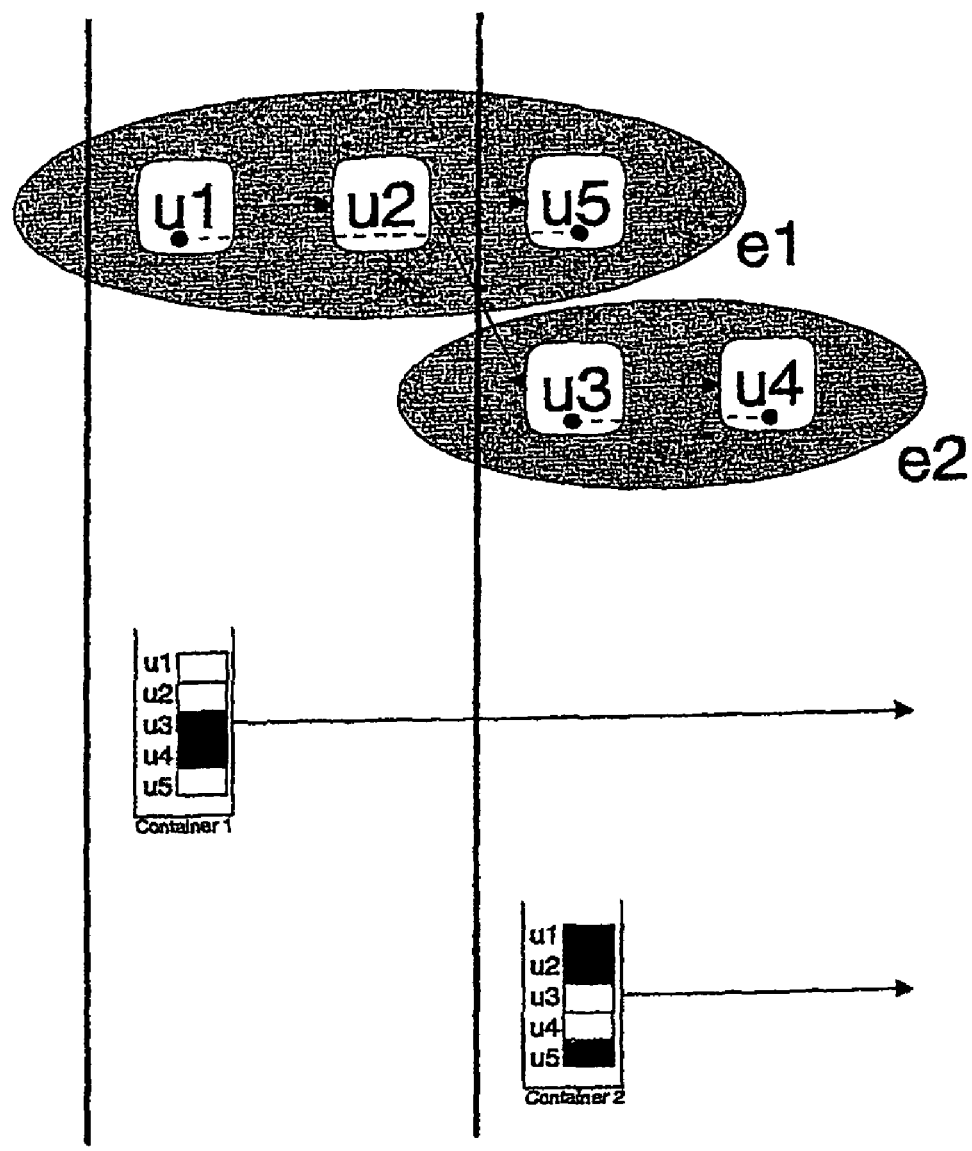
FIG. 6D shows multiple envelopes each encompassing a subset of the nodes of a network.

In network environments for which operational data gathering is required, there can be a multiplicity of networks each with a multiplicity of processing units. The scenarios for gathering of operational data include the following:

1. An 'envelope' bounds all the processing units within the network. Such an example is shown in FIG. 6A, in which the envelope (e1) bounds all the processing units (u1 ... u5) within the network. As the flow of control passes through the processing units, operational data is accumulated into a single container via the gatherer.
2. An envelope bounds a subset of the processing units within the network (see FIGS. 6B and 6D). A network of processing units may encompass/include several envelopes as in FIG. 6D. In FIG. 6B, the envelope (e1) bounds a subset of the processing units (u1,u5,u4) within the network. As the flow of control passes through the processing units, bounded by the envelope, operational data is accumulated into a single container via the gatherer. FIG. 6D is an example of one network with multiple envelopes collecting discrete operational data.
3. An envelope spans multiple networks (see FIG. 6C). The envelope (e1) spans multiple networks (u1 ... u3,v1 ... v2). As the flows of control pass through the processing units in each network, bounded by an envelope, operational data is accumulated into a multiple containers via the gatherer. These containers are then merged when the envelope closes.

The container can be optimised in a known network by predefining it's shape based on the processing units within the network (as in FIGS. 6A to 6D). In a dynamic network the shape of the container will be determined by the flow of control. It is also possible to have a hybrid of the two.

A further processing step of the monitoring method according to the present embodiment is the accumulation 250 of data from the set of containers corresponding to an envelope. This accumulation step 250 is performed by a collector component 120. Accumulation by the collector is performed independent of the step of storing operational data into containers, and the processing of each container by the collector is serialized as described below. This avoids the potential interlock (resource contention) that could otherwise arise between different instances of the data gathering mechanism.

Each container 90 represents a complete set of operational data gathered during one or more execution instances of the flow of processing along a computational path of the network. A gatherer execution instance passes operational data to each created container and then passes 240 the completed containers to an intermediate asynchronous delivery mechanism (the "conveyor" 110) which is a logical FIFO queue of containers. Each newly completed container for a computational flow is chained to the tail end of the unidirectional conveyor queue 110 by the gatherer 80. The collector reads 250 containers from the head of the conveyor queue 110, and updates the relevant one of its accumulated containers (according to the type of data captured and the user-defined logical boundary referred to earlier). This accumulation step 250 is implemented by the collector by reference to the processing flow identifier information within each container and the user-defined envelope boundaries. Thus the flow of containers through the collector in FIG. 2 is from right to left, with containers added to the right-hand end and read from the left-hand end of the conveyor queue.

The Collector 120 keeps reading from the Conveyor 110 and accumulating data from the containers 90 into "accumulated containers" (collector-managed containers which are a merge of records for the containers within a logical boundary) until one of the following events occurs:
1. A Snapshot Time interval has expired for the reporting of Snapshot data (see explanation of snapshots below).
2. A Major Interval (Archive period) has expired for the reporting of Archive data.
3. The gathering version (read from a container 90—see above) has been incremented which indicates that the shape of the envelope has changed.
4. A Broker shutdown has occurred.
5. The User has requested that Statistics for a particular data flow should be reset for this Major interval. That is all data gathered up until this point and not yet output should be dumped from the Collector.

In all of the above-listed cases 1-4, the Collector outputs 260 the data accumulated into the current accumulated collector up until this point, and passes this data to an appropriate one of a number of writer components 130 (depending on the processing required by the user—such as statistics report generation, performance problem analysis, etc).

In case 1 above, Snapshot records are output and initialized and a new Snapshot interval starts immediately. Similarly in case 2, Archive records accumulated up until this point are output, and initialized and a new Archive interval is started. In cases 3 and 4, both Archive and Snapshot records accumulated up until this point are output, initialized, and new intervals started.

When any of the above 5 events have been dealt with, the Collector resumes reading input from the Conveyor.

The collector accumulates data in a manner that satisfies the need for both "historical" archive data (i.e. data captured over a period of many hours or days), and a snapshot (i.e. data captured over a much shorter interval). The snapshot view will be the most recent subset of data that has been collected. This will typically be over a period of minutes and/or seconds. To achieve this, the collector supports accumulation of data for discrete sub-intervals of time that in aggregate fully cover the larger archive collecting interval. The collector accumulates data within these sub-intervals, and the snapshot data is produced from the most recent complete sub-interval accumulation.

Two collector-accumulated containers are maintained—one for Archive records and another for snapshot records. Incoming gathering containers are read from the conveyor and are simultaneously used to accumulate data into the corresponding collector-accumulated Snapshot container and Archive container.

Logical boundaries or envelopes are useful for managing and analysing data, since they allow the user to group operational data in whatever manner is appropriate to the output required by the user. For example, a system administrator who manages a specific network domain may only wish to monitor performance and other operational data for their specific network domain, and to receive reports once per day. This is achieved by a gatherer-configuration step in which the administrator selects the set of nodes of the network domain and specifies the reporting interval for archive statistics.

Alternatively, a user may need separate reports of operational data for each computational path within a single computer program, and in this case the envelope may encompass the connected set of nodes of a computational flow over a defined time period such as 30 minutes from the start of data gathering.

Any data which is relevant to processing nodes outside of the current selected set of nodes is outside of the current "envelope" and so, if recorded at all, is recorded separately from operational data for the selected set of nodes. An envelope can contain a number of logical containers—such as if multiple executions of the computational flow are to be accumulated in a single envelope, or if different nodes within a selected network of asynchronous processing nodes have separate containers that are to be accumulated.

The use of containers and envelopes for storing newly generated operational data in logically meaningful blocks avoids the potentially very complex analysis of stored operational data that would otherwise be required to identify relevant boundaries in stored data.

The data gatherer implements functions in response to calls from the event listener components, to control collection within an "envelope" corresponding to a logical execution boundary (such as a transactional boundary or a physical system boundary). The function calls include the following:

Start Gathering—at the point where a first processing unit in the network begins waiting on input (this may precede thread allocation)

Start Message—at the point where a valid input message is received (or, equivalently, the first flow into the envelope is encountered) and begins to be processed through the network.

Notify—of processing errors
Notify—of timeouts during waiting on input
Notify—of Rollback of transactions
Notify—of commit of transactions
Notify—of connection point invocation
Notify—of processing node invocation
Switch—gathering from one processing unit to another specified processing unit
End Gathering—at the point where the processing of an input message (or other data item processed by a flow execution) is logically complete. This is end of the envelope.

The gatherer responds to the above calls and determines when to create a new container, whether to retain a container to accumulate multiple passes or to manage asynchronous processing units, and whether to hand-off the container to the collector mechanism. The determination is based on a combination of fixed responses to certain calls and criteria defined during a configuration step. For example, Start Gathering and End Gathering delimits an envelope. The system may be configured to start a new container and pass operational data to the new container in response to every Switch call from the event listeners, or a single container may be used for operational data from a sequence of nodes. The system will typically be configured to merely increment a counter in response to notifications of transactional rollbacks. The gatherer is used to manage this gathering of data for a number of events within the user-defined logical execution boundary or envelope. The hand-off of data during gathering can be implemented using fixed system parameters that cannot be altered by a typical end user. However, the user typically does define a major interval period which controls the reporting period for the collector.

For single-thread (synchronous) processing the start and end points of an envelope and the lifetime of a container may coincide. In such cases, there may only one container to "accumulate" in the collector—such as in the case of a synchronous message flow execution according to the implementation example described later. For multi-threaded (asynchronous) processing, the process is similar except that at Switch points (when transferring computational flow from a first to a second connection point at the interface between processing units) new containers may be formed rather than continuing to use a single container. Both containers would remain within the gathering envelope. In this case a container would be 'transferred' to the collector when its thread terminates, or leaves off processing for that envelope. The envelope identifier is placed on each container as it is created so that the collector may accumulate the separate containers for a given envelope.

The collector reads the gathering containers, accumulating data from multiple containers when the current envelope includes more than one container. Each gathering container contains discrete sections for each different type of operational data being collected. The discrete sections can also be used when necessary to differentiate between different originating processing units.

A feature of the monitoring solution described above is that data gathering and processing of the gathered data can be implemented as an almost entirely independent mechanism from the data processing flow which is being monitored. Such a non-intrusive monitoring approach avoids the large operational distortions of the monitored data processing flow which are inherent in many known solutions.

The solution described above has beneficial applications in the domains of both autonomic computing and e-business on demand (EBOD). In the former there is a need to gather metrics from networks of processing units, or from discrete parts of those networks, to manage the self healing of the network components. In the world of e-business on demand the granularity of measurement of parts of a network is important for charging back for the usage of those parts.

Message Broker Application

One implementation of the present invention provides a mechanism for reporting of operational data from a message broker of a messaging system. However, the invention is not limited to such systems and can be used to monitor operational data and to generate performance and statistics reports and accounting data for a wide range of different data processing systems and computer programs or components. Before describing the features of a message broker implementation in detail, some background of messaging, message brokers and message flows will be useful.

The ability to rapidly adopt, integrate and extend new and existing data processing technologies has become essential to the success of many businesses. Heterogeneity and change in data processing networks has become the norm, requiring communication solutions which achieve interoperability between the different systems. Application-to-application messaging via intelligent middleware products provides a solution to this problem.

Messaging and Message Brokers

For example, IBM Corporation's MQSeries and WebSphere MQ messaging and queuing product family is known to support interoperation between application programs running on different systems in a distributed heterogeneous environment. Message queuing and commercially available message queuing products are described in "Messaging and Queuing Using the MQI", B. Blakeley, H. Harris & R. Lewis, McGraw-Hill, 1994, and in the following publications which are available from IBM Corporation: "An Introduction to Messaging and Queuing" (IBM Document number GC33-0805-00) and "MQSeries—Message Queue Interface Technical Reference" (IBM Document number SC33-0850-01). The network via which the computers communicate using message queuing may be the Internet, an intranet, or any computer network. IBM, WebSphere and MQSeries are trademarks of IBM Corporation.

The message queuing inter-program communication support provided by IBM's MQSeries and WebSphere MQ products enables each application program to send messages to the input queue of any other target application program and each target application can asynchronously take these messages from its input queue for processing. This is implemented under transactional support to provide assured delivery of messages between application programs which may be spread across a distributed heterogeneous computer network.

The message delivery can be achieved without requiring a dedicated logical end-to-end connection between the application programs.

There can be great complexity in the map of possible interconnections between the application programs. This complexity can be greatly simplified by including within the network architecture a communications hub to which other systems connect, instead of having direct connections between all systems. Message brokering capabilities can then be provided at the communications hub to provide intelligent message routing and integration of applications. Message brokering functions typically include the ability to route messages intelligently according to business rules and knowledge of different application programs' information requirements, using message 'topic' information contained in message headers, and the ability to transform message formats using knowledge of the message format requirements of target applications or systems to reconcile differences between systems and applications.

Such brokering capabilities are provided, for example, by IBM Corporation's MQSeries Integrator and WebSphere MQ Integrator products, providing intelligent routing and transformation services for messages which are exchanged between application programs using MQSeries or Websphere MQ messaging products.

Support for both management and development of message brokering applications can be implemented in a message broker architecture to provide functions including publish/subscribe message delivery, message transformation, database integration, message warehousing and message routing. Message flows are a visual programming technology which support all of these broker capabilities and greatly ease the task of management and development of message brokering solutions.

Message Flows

A message flow is a sequence of operations performed by the processing logic of a message broker, which can be represented visually as a directed graph (a message flow diagram) between an input queue and a target queue. Message flows can also be programmed visually. The message flow diagram consists of message processing nodes, which are representations of processing components, and message flow connectors between the nodes. Message processing nodes are predefined components, each performing a specific type of processing on an input message. The processing undertaken by these nodes may cover a range of activities, including reformatting of a message, transformation of a message (e.g. adding, deleting, or updating fields), routing of a message, archiving a message into a message warehouse, or merging of database information into the message content.

There are two basic types of message processing nodes: endpoints and generic processing nodes. Endpoints represent points in the message flow to which message producers may send messages (input nodes) or from which message consumers may receive messages (output nodes). Endpoints are associated with system queues and client applications interact with an endpoint by reading from or writing to these queues. Generic processing nodes take a message as input and transform it into zero, one, or more output messages. Each such message processing node has a set of input connection points (InTerminals) through which it receives messages, and a set (possibly empty) of output connection points (OutTerminals), through which it propagates the processed message. Message processing nodes have properties which can be customized. These properties include expressions that are used by the processing node to perform it's processing on input messages.

A message flow is created by a visual programmer using visual programming features of the message broker. This involves placing message processing nodes on a drawing surface, and connecting the out terminal of one node to the in terminal of another node. These connections determine the flow of the messages through the message processing nodes. A message flow can contain a compound message processing node which is itself a message flow. In this way message flows can be built modularly, and specific message processing functionality can be reused.

Message Flow Execution

Message flows are executed by an execution engine that can read a description of a message flow, and invoke the appropriate runtime code for each message processing node. This will be referred to later. Each message flow has a thread pool which can be configured to have between 1 and 256 threads. When an input node for a message flow is constructed it takes one thread from its thread pool and uses it to listen to the input queue. A single thread carries a message from the beginning of the flow through to the end, and hence the thread can be used to identify the message as it passes through the flow.

The queuing of an input message on that input queue initiates execution of the message flow on the queued message. The message is then propagated to the target nodes of the connectors originating from the output terminal of the input node. If there is more than one outgoing connector, copies of the message are created and handled independently by the subsequent nodes. If the node is an output node, the message is delivered to the associated message queue; otherwise the processing node will create zero or more output messages for each of its output terminals. Messages are propagated to subsequent nodes as described above.

A message processing node will process an input message as soon as it arrives and retain no information about the message when it has finished its processing. A processing node might output more than one message of the same type through an output terminal and several copies of the same message might be propagated if there is more than one connector originating from an output terminal; all of these messages are processed independently of each other. A processing node does not necessarily produce output messages for all of its output terminals—often it will produce one output for a specific terminal depending on the specific input message. Also, a node might produce messages for output terminals that are not connected to other processing nodes, in which case the message is not processed further.

Monitoring Message Flows

A solution for monitoring of message flows is described in the commonly-assigned, co-pending US Patent Application Publication No. 2002/0120918 in the name of Aizenbud-Reshef et al, entitled "Monitoring messages during execution of a message flow," published 29 Aug. 2002, which is incorporated herein by reference. US Patent Application Publication No. 2002/0120918 describes inserting progress report generator nodes within a message flow for monitoring execution progress in a test and debugging environment.

An implementation of the present invention can also be used for monitoring message flows within a message broker. The operational data gathering mechanism selectively gathers statistics such as elapsed time, CPU usage, and invocation counts for processing nodes in a message flow. The implementation uses event listener components located at connection points between the nodes of the message flow to make function calls to a data gatherer component. The calls invoke functions of the gatherer to save operational data into logical containers for subsequent processing and reporting. A user can specify, by command line entries, whether data gathering is enabled for a message flow, all message flows within a broker domain, or all message flow processing within a message broker. The following description relates to the example of monitoring of operational data for a specific message flow.

The start of a predefined data gathering period corresponds to the start of a new gathering envelope and construction of a first new container. This may be prior to thread allocation, and at this stage a first node of the message flow is merely waiting for input. Receipt of an initial message triggers the beginning of a message flow execution instance. In the particular implementation described here, a message carries a reference to a gatherer proxy. The proxy is a lightweight inline entity that interrogates system values to determine whether notifications received from the event listeners should be forwarded to the underlying data gatherer. The event listener code provided within the connection terminals of nodes of the message flow sends notifications to the proxy gatherer, which determines with reference to the system values whether to forward the notification to the gatherer mechanism associated with the proxy or to ignore the notifications.

When the processing flow progresses to a subsequent node of the message flow, the connecting input terminal of the receiving node makes a function call to the gatherer which switches off data gathering on behalf of the propagating node and switches gathering on for the receiving node. Gathering switching occurs in both directions through the message flow terminal. Because statistics are collected for entire envelopes, which may contain a complete message flow execution or may accumulate a number of containers corresponding to a number of executions, the same container may continue to be used when node-switching occurs. However, when node-switching occurs, the container starts receiving operational data into a separate segment within the container relating to the new node.

An event listener waits for events within the monitored data processing sequence, and sends notifications/invocations to the gatherer as described above. The event listener of the gathering mechanism for monitoring a message flow provides the following function calls:
- to signal when the event listener has started gathering statistical data,
- to notify when timeouts, rollbacks, commits or errors occur,
- to indicate when an input message has been successfully de-queued and is starting to be processed,
- to signal when the processing for an input message is complete to signal when the thread processing the message is about to become idle.

Another 'Switch' call is provided for use in the connection points (terminals) between the processing nodes to indicate when to stop gathering data from the previous node and when to start gathering for the next.

The gatherer saves operational data to a logical container in response to notifications from the event listener at specific points during processing on the current thread. The collector registers an interest in notification of a system generated event. This could be an operating system timer signal or a specific system broadcast. The event is used to indicate to the collector that a collection interval has ended for collecting data, and that a new interval has begun. An end of collection interval notification is sent to the collector upon sampling interval expiry.

If a user specifies a Major Interval (for Archive) through a command line entry, then the system clock is used to control the expiry of a reporting interval within the Collector. On some operating system platforms, the Collector can respond to system broadcasts (such as the Event Notification Facility (ENF) on IBM Corporation's z/OS operating system) to control the expiry of the reporting interval for Archive data. In one particular implementation, the user can specify a value of 0 (zero) on the z/OS operating system for the Major Interval to signal to the Collector that an external system broadcast is to be used. Using a system broadcast on the z/OS operating system can be beneficial for users who wish to synchronize reporting of statistics for different products (for example, creation of container records for a message delivery program and a message-flow-based message broker program). z/OS is a trademark of International Business Machines Corporation.

Each statistics gathering container includes an identifier for the Message flow (which corresponds to the envelope in the simplest case) and another for the thread processing the input messages through the flow. The container is used to hold and accumulate statistical data such as elapsed time, CPU usage, invocation counts, message sizes, divided into discrete sections such as Message flow, Thread and individual Data Flow Nodes. The logical data model for a message flow data container is shown in FIG. 3. FIG. 3 shows a root data structure (or parent) that contains message flow related data, with child structures that contain either thread related, or message flow node related data. The node child structures can each have children of their own that contain node-terminal related data.

A collector accumulates the set of containers relating to an envelope, as described above, and outputs accumulated data to one or more output components for periodic reporting of statistical or accounting data, or for performance analysis and reporting. An example of the data produced is the average elapsed time for processing messages in each node of a message flow on an execution group of a specific message broker over a specific 30 minute period on a given date.

It is possible for the collector (described previously) to perform post-processing accumulation which spans multiple envelopes. The gathering mechanism can also be instrumented to accumulate statistics for multiple envelopes (processed on a particular persistent thread) in a single container. In this way, the gathering mechanism can perform "pre-accumulation" of the data on behalf of the collector mechanism, and reduce traffic on the conveyor mechanism (also described above). The decision to start a new container for a new envelope, or to use an existing container (for pre-accumulation) is made by the gathering mechanism at the start of envelope processing (this is the point at which a thread is assigned to an actual processing flow). When the gathering mechanism is created, the ability or lack of ability to make this decision is determined together with the criteria to be used. In the present implementation, the gathering mechanism is created when the message flow processing is configured—this is the point at which the topology of the network of processing units within an envelope is determined.

Users are able to select the level of granularity of data they wish to capture—such as specifying requirements for thread related, node related and/or node terminal related data. The accumulated data is output from the collector at intervals specified by the user. The format of the data is also determined by user requirements (and platform characteristics). Once specified by the user, collection intervals are controlled by a system event, such as a timer or broadcast. Accumulated data for a collection interval is historical in most cases—being captured over a period of several hours or days. The accumulated data can be processed by a number of different applications to produce reports off-line. However, a more current "snapshot" view of the collected data is also made available (either published at regular intervals, or in response to user requests). The intervals for which snapshots are taken can be configured to be much shorter than the collection interval. This enables, for example, a user to be informed of the current level of thread usage in a message flow at sufficiently short intervals to take preventative measures if thread usage approaches a maximum.

As well as specifying collection periods and snapshot times, the user can use a message broker configuration command to switch operational data monitoring on and off and to specify that the monitoring be applied to a specific message flow, or all flows in a broker execution group, or all execution groups belonging to the message broker.

Multiple containers may be created in a single envelope when a Message Flow contains an aggregate reply node. One container captures data from the thread started in the input node for the control input, a second container captures data for generating statistical information for the input node that manages the reply messages, and a further container captures data for the work in an aggregate node timeout thread. This is an exception to the normal rule that Message Flows are collections of synchronously executing processing nodes.

As described previously, a collecting mechanism accumulates operational data that is passed to it in gathering containers generated by one or more instances of gatherers, while avoiding interlock between separate instances of the gathering mechanism. Since gathering points are synchronized with the connection points between the processing nodes, it is necessary to avoid distortion of the processing flow while gathering and accumulating the operational data.

The solution to avoid interlocking of gathering and collecting points is to provide an intermediate mechanism referred to here as the conveyor. This is a logical FIFO queue of containers that represent complete sets of operational data gathered during the flow of processing along the path of a network. Each gathering instance outputs a completed gathering container to the conveyor, and completed containers are chained to the end of the conveyor queue.

When the collector is ready to accumulate more data from the gathering mechanism, a container is obtained from the conveyor. The conveyor is solely responsible for enqueing and dequeuing containers from its queue and avoids and potential processing interlock between the collector and its gatherers.

Asynchronous (non-locking) queuing is well known in the art and available on many platforms, and so it is not necessary to describe such features in detail herein. Using non-locking, asynchronous queuing, the gatherer is not required to wait for the collector. Assuming suitable data is being supplied to the monitoring components, only the collector need ever wait. The above-described gathering mechanism imposes minimal overhead on the processing network.

In the message broker implementation, a statistics gathering and collecting mechanism separates a single collecting thread that accumulates statistical data gathered from multiple instances of a message flow or flows. Data gathering relates to individual processing threads within a message flow, and each thread gathers data into a unique container for that instance of the flow. When a gathering container is considered complete for the processing thread it is queued onto a conveyor.

A separate thread is dedicated to a collector mechanism which requests the next available gathering container from the conveyor. The conveyor dequeues a gathering container or batch of containers and passes this to the collector. The collector then accumulates the data as is appropriate.

Figure 7A:
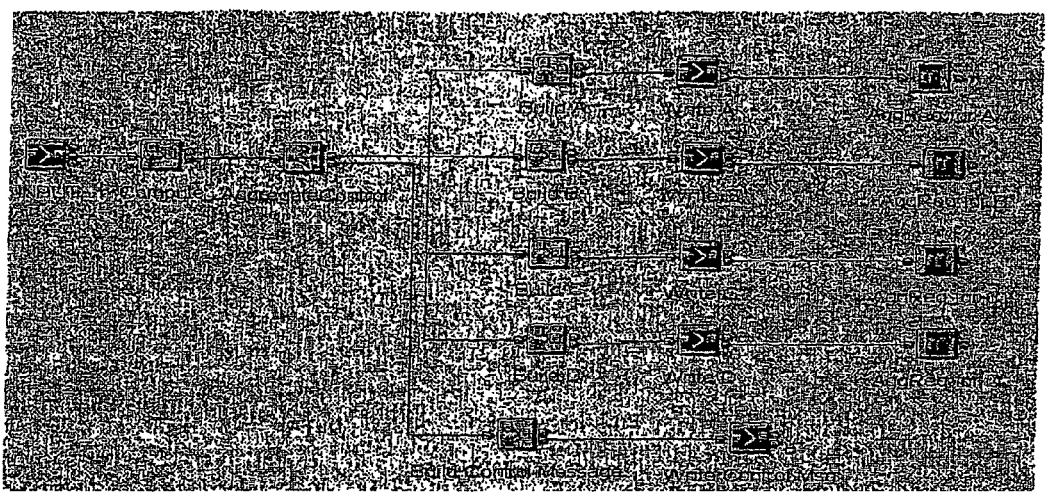
FIGS. 7A and 7B show specific processing phases of an example message flow.
Figure 7B:
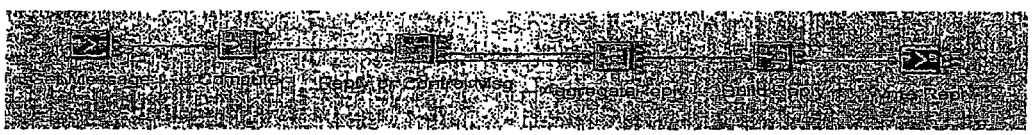

The following is a specific example of the invention in use in a message broker. FIG. 7 illustrates use of aggregate nodes within a message broker message flow. With the aggregate nodes, request messages are generated in what is referred to as Fan-out phase. Replies to the requests are received and processed by a message flow during the Fan-in phase. The flow in FIG. 7A performs the fan out processing. The flow in FIG. 6B performs the fan-in processing. Note in this case that there are four requests generated from the original request message. All the replies are directed to a single input queue in the fan-in flow.

Figure 8:
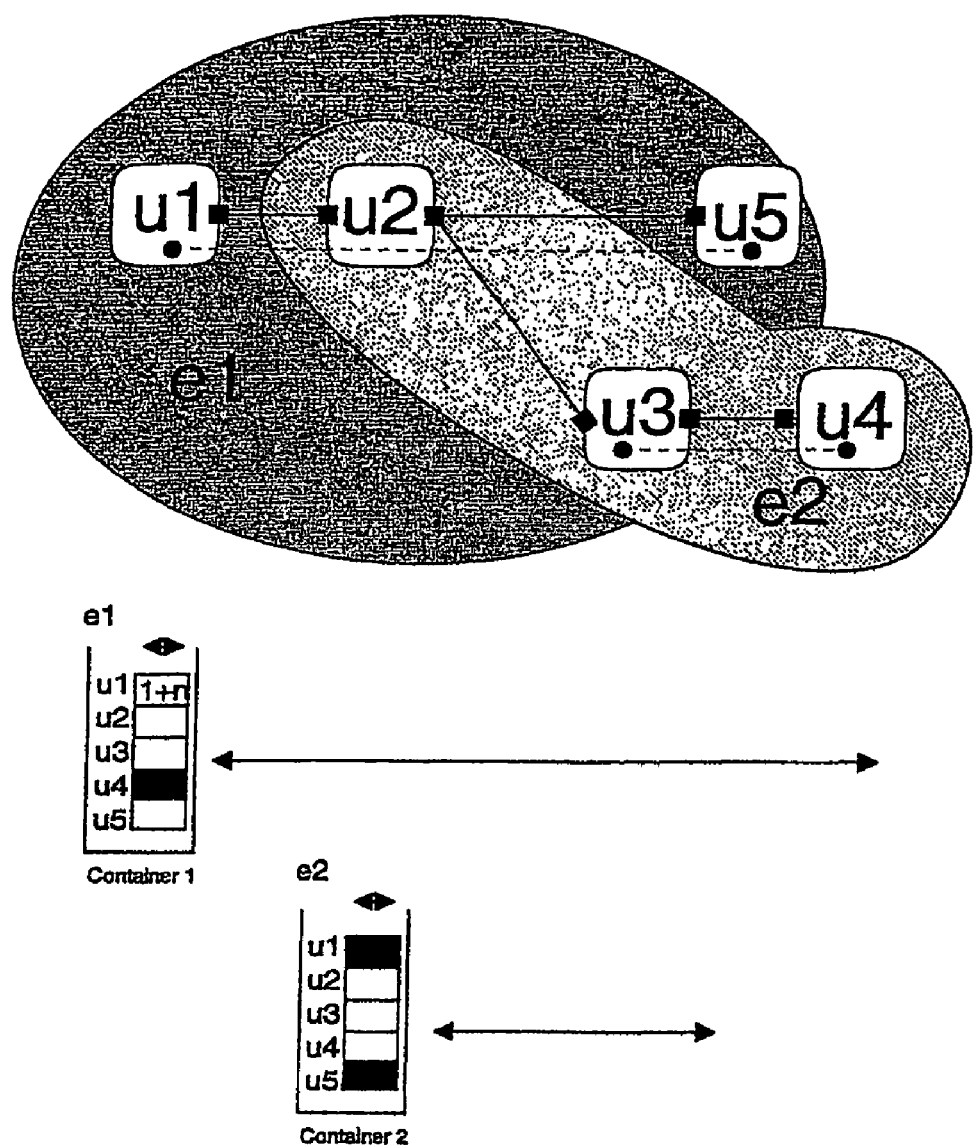
FIG. 8 shows a simplified example of overlapping envelopes related to the example of FIGS. 7A and 7B.

In FIG. 8, the number of processing units has been simplified to improve clarity. Envelope "e1" represents the whole of the Fan-out message flow and the Fan-in flow with the exception of the "Build Reply" and "Write Reply" nodes. A second envelope "e2" encompasses just the "Aggregate Control" node from the Fan-out flow and all of the Fan-in flow. With this approach, the gathering of operational data from envelope "e1" can be used to analyse the distribution of Request messages, whereas envelope "e2" would focus on the combined aggregation processing across both message flows.

The invention claimed is:

1. A data processing apparatus for monitoring and storing operational data relating to a plurality of data processing units, comprising:
    a processor configured to include:
        a data gatherer for gathering and allocating operational data for a selected set of the data processing units into discrete data containers, respectively, based upon specified boundaries for data collection; and
        a collector, running asynchronous to the gatherer, for accumulating data, from the data containers that correspond to a defined logical boundary, into an accumulated container.

2. The data processing apparatus according to claim 1, wherein
    the plurality of data processing units comprise a set of program code components connected to form a plurality of processing paths within a computer program computational flow.

3. The data processing apparatus according to claim 1, wherein
    the specified boundaries include physical boundaries, corresponding to a user-specified set of data processing units, which limits allocation of operational data, related to the user specified set of data process units, into a particular discrete data container.

4. The data processing apparatus according to claim 1, wherein
    the specified boundaries include temporal boundaries, corresponding to a specified data gathering period, which limits allocation of the operational data, related to the specified data gathering period, into a particular discrete data container.

5. The data processing apparatus according to claim 1, wherein
    the specified boundaries include an event, upon which allocation of operational data is switched from a first discrete data container to a second discrete data container.

6. The data processing apparatus according to claim 1, wherein
    the data gatherer allocates operational data for the selected set of data processing units into the discrete data containers, respectively, for each processing thread executed by the selected set of data processing units.

7. The data processing apparatus according to claim 1, further comprising a queue-based transfer mechanism for receiving data containers from the data gatherer and from which the collector dequeues data containers for accumulation.

8. The data processing apparatus according to claim 1, wherein
each of the plurality of data processing units includes an event listener for sending notifications to the data gatherer in response to events within a monitored sequence of data processing operations;
responsive to notifications from the event listeners, the data gatherer controlling the allocating of operational data to the discrete data containers.

9. The data processing apparatus according to claim 8, wherein
the data gatherer is responsive to a first type of notification from the event listeners to switch allocation of operational data from a first discrete data container to a second discrete data container.

10. The data processing apparatus according to claim 9, wherein
the first type of notification corresponds to a sequence of data processing operations has progressed from a prior data processing unit to a subsequent data processing unit within the plurality of data processing units.

11. The data processing apparatus according to claim 9, wherein
the first type of notification corresponds to completed execution of the monitored sequence of data processing operations.

12. The data processing apparatus according to claim 8, wherein
the event listeners are configurable to:
send, to the data gatherer, a notification of the start of data gathering for a specific sequence of data processing operations in response to a first event relating to the sequence of data processing operations, and
send, to the data gatherer, a notification of the end of data gathering for the specific sequence of data processing operations in response to a second event within the sequence of data processing operations,
the data gatherer, responsive to the start notification, initiating a discrete data container, and
the data gatherer, responsive to the end notification, terminating allocation of operational data to the initiated data container.

13. The data processing apparatus according to claim 8, wherein
each of the plurality of data processing units includes
an input connection point for receiving data,
operational data processing component for processing data, and
output connection points for receiving processed data for output from the respective data processing unit; and
for each of the plurality of data processing units, the event listener is located at the input connection point, and
the event listener, responsive to data received by the respective input connection point, sends the notification to the data gatherer.

14. A method for monitoring operational data relating to a plurality of data processing units, comprising:
in response to gathered operational data, allocating, using a computer hardware system, operational data to discrete data containers, respectively, based upon specified boundaries for data collection; and
accumulating data, asynchronously from the step of allocating operating data and using the computer hardware system, from the data containers that correspond to a defined logical boundary, into an accumulated container.

15. The method according to claim 14, wherein
the plurality of data processing units comprise a set of program code components connected to form a plurality of processing paths within a computer program computational flow.

16. The method according to claim 14, wherein
the step of allocating operational data is responsive to physical boundaries, corresponding to a user-specified set of data processing units, which limits the allocating of operational data, related to the user specified set of data process units, into a particular discrete data container.

17. The method according to claim 14, wherein
the step of allocating operational data is responsive to temporal boundaries, corresponding to a specified data gathering period, which limits the allocating of the operational data, related to the specified data gathering period, into a particular discrete data container.

18. The method according to claim 14, further comprising
switching the allocation of operational data from a first discrete data container to a second discrete data container, wherein
the specified boundaries includes an event, upon which the allocation is switched.

19. The method according to claim 14, including the steps of:
generating, using one or more event listeners, event notifications in response to events within a monitored sequence of data processing operations; and,
in response to the event notifications from the event listeners, controlling the allocation of operational data to the discrete data containers.

20. A computer program product comprising a computer-readable storage media having stored therein computer usable program code for monitoring operational data relating to a plurality of data processing units, said computer usable program code, when executed by a computer hardware system, cause the computer hardware system to perform:
in response to gathered operational data, allocating operational data to discrete data containers, respectively, based upon specified boundaries for data collection; and
accumulating data, asynchronously from the step of allocating operating data, from the data containers that correspond to a defined logical boundary, into an accumulated container.

21. The computer program product according to claim 20, wherein
the plurality of data processing units comprise a set of program code components connected to form a plurality of processing paths within a computer program computational flow.

22. The computer program product according to claim 20, wherein
the step of allocating operational data is responsive to physical boundaries, corresponding to a user-specified set of data processing units, which limits the allocating of operational data, related to the user specified set of data process units, into a particular discrete data container.

23. The computer program product according to claim 20, wherein
the step of allocating operational data is responsive to temporal boundaries, corresponding to a specified data gathering period, which limits the allocating of the operational data, related to the specified data gathering period, into a particular discrete data container.

24. The computer program product according to claim 20, further comprising switching the allocation of operational data from a first discrete data container to a second discrete data container, wherein the specified boundaries includes an event, upon which the allocation is switched.

25. The computer program product according to claim 20, including the steps of:

generating, using one or more event listeners, event notifications in response to events within a monitored sequence of data processing operations; and, in response to the event notifications from the event listeners, controlling the allocation of operational data to the discrete data containers.

* * * * *